Feb. 1, 1955 W. C. SPEED ET AL 2,700,955

APPARATUS FOR THE PRODUCTION OF MAGNETIC SOUND TAPE

Filed Dec. 21, 1950 3 Sheets-Sheet 1

INVENTOR
William C. Speed
James J. Dwyer
BY
Pennie, Edmonds, Morton & Barrows
ATTORNEYS INVENTOR
William C. Speed
James J. Dwyer
BY
Pennie, Edmonds, Morton & Barrows
ATTORNEYS Feb. 1, 1955 W. C. SPEED ET AL 2,700,955

APPARATUS FOR THE PRODUCTION OF MAGNETIC SOUND TAPE

Filed Dec. 21, 1950 3 Sheets-Sheet 3

INVENTOR
William C. Speed
James J. Dwyer
BY
Pennie, Edmonds, Morton & Barrows
ATTORNEYS 2,700,955

APPARATUS FOR THE PRODUCTION OF MAGNETIC SOUND TAPE

William C. Speed, Riverside, and James J. Dwyer, Stamford, Conn., assignors to Audio Devices, Inc., New York, N. Y., a corporation of New York Application December 21, 1950, Serial No. 201,984

9 Claims. (Cl. 118—415)

This invention relates to the production of magnetic recording tape and has for its object more particularly improvements in the method of and apparatus for coating a tape base with finely divided magnetic material.

In copending applications, Serial Nos. 201,974 and 201,975, filed December 21, 1950, simultaneously herewith there is disclosed what may be characterized as an overall method and apparatus for producing magnetic recording tape. The tape base is shown to be processed in a succession of zones, including charging, precoating and predrying, if desired, magnetic coating, drying, magnetic monitoring, aligning, discharging, etc. The present application relates to the method and apparatus involved more especially in the magnetic coating stage.

Various tape base materials may be used, such as plastics, paper, etc., the most common being paper and cellulose acetate. Various magnetic materials may be used for the coating, the one most commonly used at the present time being very finely divided magnetic oxide of iron; not the natural magnetic oxide of iron, but one that is produced artificially because its quality can be better controlled. A dispersion of the magnetic material in a suitable vehicle or carrier is prepared, the vehicle usually carrying a solvent, such as toluol, isopropyl acetate, etc. The dispersion, while free-flowing, has a viscosity conducive to the laying of a coating of given thickness on the tape base which remains substantially intact during the drying operation. The solvent is volatilized during the drying operation leaving a solid but pliable residue of the magnetic material on the tape base.

In order to facilitate and to improve adherence of the magnetic material on the tape base, the surface of the tape base to be coated with the magnetic material may be precoated with a suitable adhesive material, such as a copolymer of polybutadiene with acrylonitrile, the methyl esters of acrylic acid, etc. The magnetic material is then laid on the adhesive surface and subjected to drying.

During either or both coating operations, the tape base is passed between a bottom support and the discharge opening of a feed hopper of the coating material, so that the coating is applied to the tape base as it moves thereunder. In the magnetic coating operation, the tape base is passed horizontally through a gap between the bottom support and the feed hopper.

No matter how carefully the tape base is made or how carefully the coating operation is conducted, difficulties arise which affect the results. Thus, the tape base itself will have an occasional pimple or berry-like projection on its upper or underside, or both; or a foreign particle may be deposited on and cling to the tape base. Such obstructions interfere with the passage of the tape base through the gap. They, for example, may strike the feed hopper or the support below, resulting in a tearing of the tape base. If this should happen magnetic material will continue to be discharged from the feed hopper and will spread over the surrounding portions of the apparatus. The tearing of the tape base further complicates matters by making difficult the rejoining of the torn ends by splicing or any other manner. In practically all cases tearing of the tape base requires the coating operation to be stopped until the resulting mess is cleaned up. Even though the obstruction should pass through the tap without tearing the tape base, it may impair objectionably the quality of the magnetic coating applied to the tape base. It may, for example, prevent the deposit of a coating of uniform thickness transversely of the tape base.

Difficulties and disadvantages of the kind enumerated, as well as others, may for the most part be avoided in the practice of the present invention; as will be better understood on referring to the accompanying drawings, taken in conjunction with the following description, in which.

Figures 1, 2:
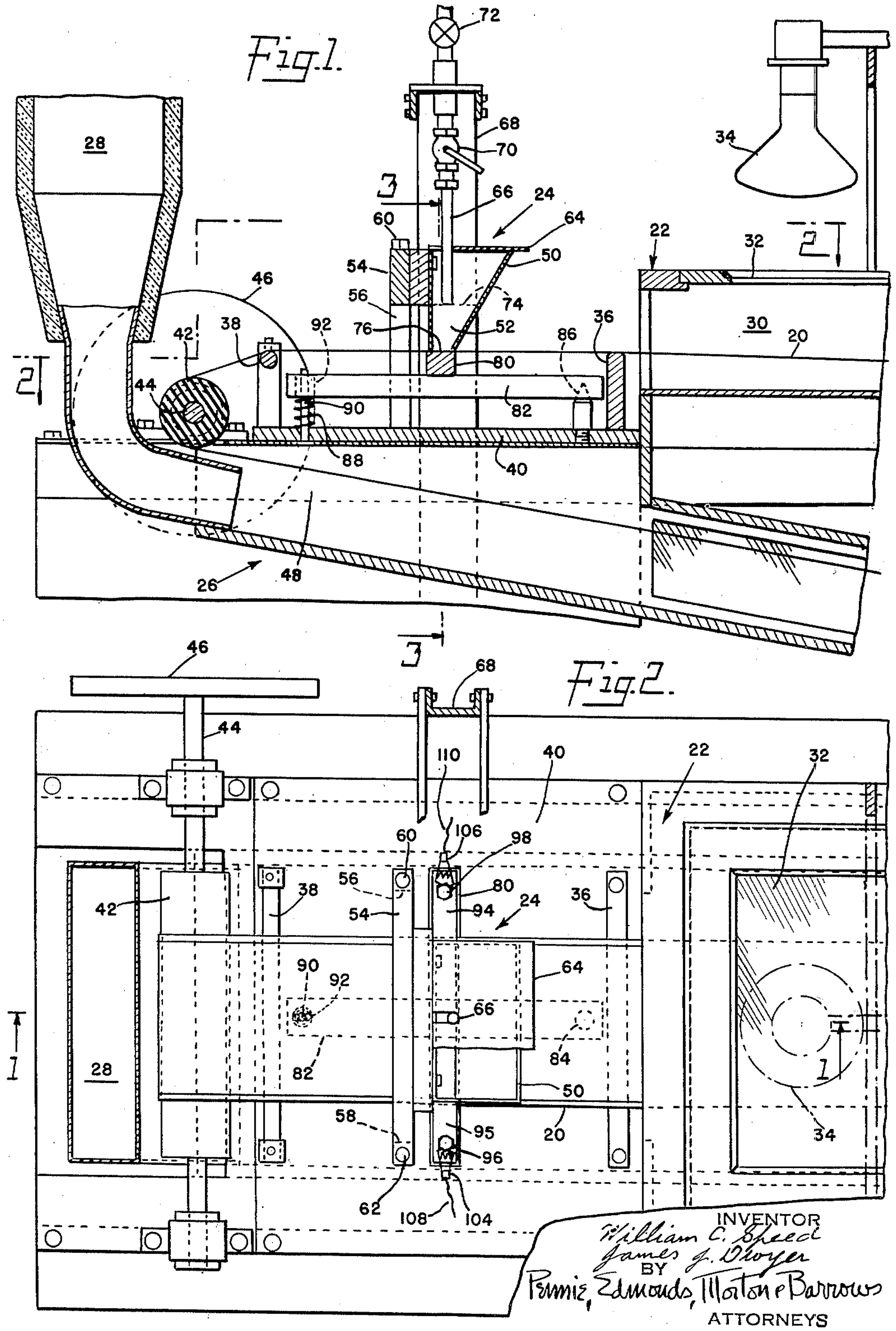
Figs. 1 and 2 are side and plan views.
Figure 3:
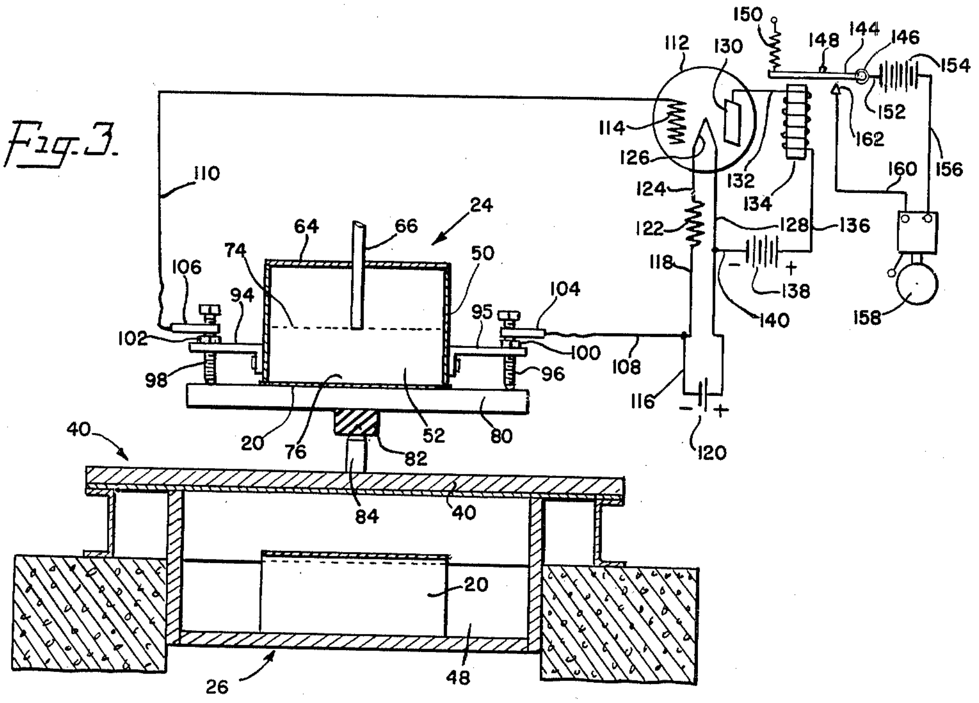
Fig. 3 is a section on the line 3—3 of Fig. 1.

Referring first to Figs. 1–3, there is shown a tape base 20 advancing through an adhesive precoat partial drying device 22, which may or may not be included, as desired, a magnetic coating device 24 and a magnetic coat drying device 26 fed with heated air from heater 28. The precoat drying device includes a chamber 30, open at its ends for the entrance and exit of the precoated tape base, surmounted by a glass top 32 through which radiant heat passes from a plurality of spaced heaters 34, such as infra-red lamps. The tape base passes through the chamber, out of contact with its walls, over a pair of spaced guides 36 and 38 supported by a platform 40, around a gripping roller 42, such as rubber, mounted on a shaft 44 terminating at its far end in a fly wheel 46, into and through a chamber 48 included in the magnetic coat drying device.

The magnetic coating device includes a feed hopper 50 for a dispersion of finely divided magnetic material 52, supported in the space between the two guides by a transverse support 54 secured at its ends to the tops of upright posts 56 and 58 by bolts 60 and 62, the lower ends of the posts being attached to the platform. The top of the hopper is provided with a removable cover 64, through which extends a feed conduit 66 held in position by a vertical support 68, fitted with a regulating valve 70 and an ordinary valve 72. The upper end of the conduit leads to a main source of finely divided magnetic material, not shown. The valves may be so regulated as to maintain the supply of magnetic material in the hopper at a predetermined level 74, such as at the lower end of the conduit.

The bottom of the feed hopper terminates in a discharge opening 76 disposed directly over and above an adjustable transverse bottom support 80 mounted intermediate the ends of a longitudinal centrally disposed under support 82 balanced at its rear end on a fixed upright pivot 84 extending into a conical recess 86 in that end of the under support and secured to the platform and at its forward end on a spring 88 fitting around a vertical rod 90 secured at its lower end to the platform and extending at its upper end through a slot 92 in the forward end of the under support.

The arrangement between feed hopper 50 and bottom support 80 is such that a gap of minimum uniform depth or height may be provided and maintained between them, and also such that the gap, however, may be increased in depth or height to permit an obstruction on the tape base to pass through the gap without damage to the tape base. In other words, the minimum depth of the gap is fixed; its maximum depth is adjustable.

To this end (Fig. 3) the ends of the feed hopper are provided with a pair of lateral supports 94 and 95 secured thereto directly above the bottom support. A pair of machine screws 96 and 98, provided with lock nuts 100 and 102, fit in threaded holes near the outer ends of the lateral supports. The lateral supports themselves or threaded sleeves, not shown, in the holes in the supports are electrically insulated. The lower ends of the screws engage the top surface of the bottom support and the screws and lock nuts may be suitably turned to form a gap of predetermined depth between the bottom of the feed hopper and the top of the bottom support. Once that gap is fixed, its depth cannot be decreased—unless, of course, the screws and lock nuts are again disturbed. Its depth cannot be decreased by the tape base, with or without obstructions, passing therethrough, which is an important feature of the construction. The depth of the gap, however, may be increased when an obstruction on the tape base strikes the bottom support and causes the bottom support to dip or drop to a lower level. The bottom support is so sensitively supported by longitudinal under support 82 on spring 88 that a small obstruction on the tape base will cause it to dip.

Still referring to Fig. 3, the apparatus shown also includes a signal system to apprise the operator that such an obstruction has reached the feed hopper. While such means may take various form, the one shown in Fig. 3 is illustrative. Being made of metal, bottom support 80 and adjustable screws 96 and 98 are utilized as conductors of electrical current in a first relay having terminals 104 and 106 secured to the screws, the terminals in turn being connected to leads 108 and 110 in the circuit of a triode tube 112. The latter lead connects the grid 114 of the triode while the former lead terminates in two branches 116 and 118, the former being connected to the negative terminal of a battery 120, and the latter being connected to a resistance 122. A lead 124 connects the resistance with the filament 126 of the triode. The other lead 128 of the filament connects the positive terminal of the battery.

The anode plate 130 of the triode connects with a lead 132 in a second relay formed of a solenoid 134, a lead 136 connecting the coil of the solenoid with the positive terminal of a battery 138 and a lead 140 connecting the negative terminal of the battery with lead 128 connecting filament 126 with battery 120 in the other relay.

Solenoid 134 is operatively associated with a third relay formed of an arm 144 pivoted at one end 146 and normally held spaced from the solenoid by a stop 148 and a spring 150 at the other end. A lead 152 connects the arm with a battery 154. Another lead 156 connects the battery with a terminal of a signal or alarm device 158, such as a bell; the other terminal being connected by a lead 160 to a terminal 162 spaced intermediate the end of a solenoid 134 and arm 144.

In order briefly to illustrate the operation of the signal means just described, it may be assumed that a portion of tape base 20 approaching feed hopper 50 contains one or more obstructions, such as a blister, a pimple or berry-like formation of the tape base material itself, or one or more foreign particles attached thereto. Since the coating of magnetic material on the tape base must be of substantial uniform optimum thickness, and that thickness amounts to only a few thousandths of an inch, it is apparent that the obstruction need not be very large in order to strike the bottom of the hopper, if the obstruction is on the top of the tape; or to strike the top of the bottom support, if the obstruction is on the bottom of the tape base.

It is imperative, therefore, that the mechanism employed be extremely sensitive, so that the obstruction will pass between the hopper and bottom support without tearing the tape base and so that the presence of the obstruction is announced. Since bottom support 80 floats freely on sensitive coil spring 88 it is quickly and easily depressed to permit passage of the obstruction. Such depression of the bottom support breaks the contact between the bottom of adjusting screw 96 and the top of the bottom support, or breaks the contact between the bottom of adjusting screw 98 and the top of the bottom support, or both.

Before the break of contact between the bottom support and the adjusting screws occurs, current passes continuously through the first relay; namely, from battery 120, through branch 116, lead 118, resistance 122, lead 124, filament 126, grid 114, lead 110, adjusting screw 98, bottom support 80, adjusting screw 96, lead 108 and branch 116 to the battery. Since grid 114 and filament 126 of the triode are both negatively charged, flow of electrons from the filament to positively charged anode plate 130 is prevented, or at least effectively inhibited, due to the negative field set up around the filament by the grid.

When, however, bottom support 80 is depressed by the passing obstructions and the circuit in the first relay is broken, no current flows to the grid and it becomes neutral. The neutralized grid, therefore, no longer prevents or inhibits the passage of electrons from the filament to the plate. The negative electrons from the filament are attracted in fact by the positively charged plate.

As current passes from battery 138 through the filament and plate, solenoid 134 is energized. Magnetization of the core of the solenoid attracts or pulls arm 144 in the third relay, causing it to contact terminal 162. When this occurs current from battery 154 passes freely through the relay causing the operation of signal or alarm device 158. In the construction shown, its bell is caused to ring thus calling the operator's attention to the fact that an obstruction on the tape base is passing underneath the feed hopper.

On hearing the signal, the operator promptly inspects the coated portion of the tape passing beyond the hopper to detect the precise location of the obstruction. He then attaches a marker on that part of the coated tape, usually by means of a relatively small adherent tab protruding beyond the edge of the tape base, so that the affected portion may be easily located later. The affected portion is usually cut out, which is done by removing a transverse section of the coated tape base and carefully splicing the resulting two ends of the main tape base having a coating of the desired uniform thickness; the two ends being joined, preferably, in an angular straight line, end to end, not overlapping, relationship—with an adhesive piece of splicing tape overlapping the two ends on the non-coated side of the tape base.

Figures 4, 5:
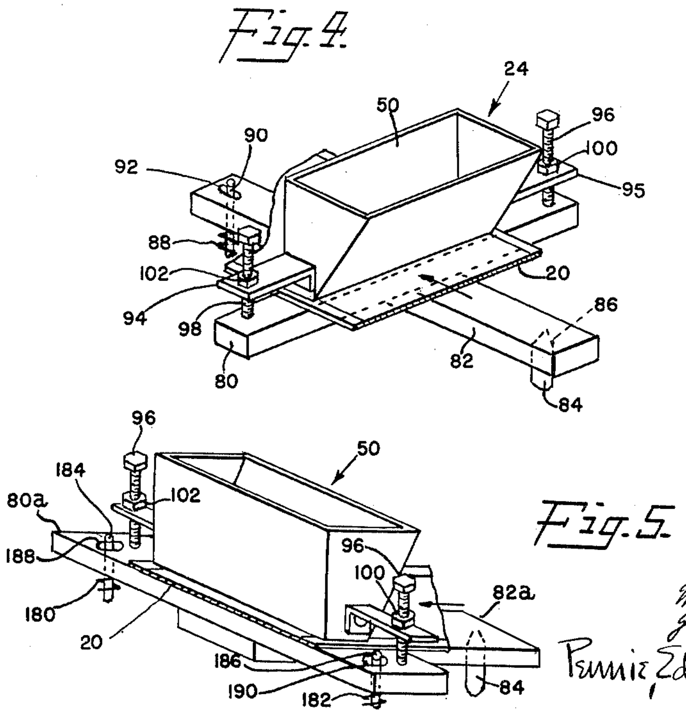
Fig. 4 is a perspective view of a form of apparatus illustrative of a practice of the invention.
Fig. 5 is a rear perspective view of a second form of such an apparatus.

The second form of apparatus shown in Fig. 5 operates in somewhat the same way as the first form just described. The essential difference in construction is that bottom support 80*a*, instead of longitudinal under support 82*a*, rests directly on a pair of spaced coil springs, 180 and 182, mounted around vertical rods 184 and 186 secured at their lower ends to the platform and extending at their upper ends through slots 188 and 190 in the lateral ends of the bottom support. The essential difference in operation of this form of apparatus over the first form is that bottom support 80*a* may be depressed readily at either end alone, or at both ends, and hence the entire support, whereas in the first form of apparatus support 80 tends to be depressed as a whole, simultaneously, to permit passage of one or more obstructions on the tape base moving thereover. While slot 92 in the first form of apparatus may be sufficiently wide to permit bottom support 80 to tilt appreciably to the left or right with respect to vertical pin 90, particularly since the other end of the bottom support is pivotally mounted on the apex of vertical pivot 84, such tilting action is not as accurately controlled as in the case of the second form of apparatus in which bottom support 80*a* rests at each end on a coil spring 180 and 182. Tilting of only one end of the bottom support is highly desirable when an obstruction appears only on the corresponding side of the tape base passing under the feed hopper. In such case the variation in thickness of the magnetic coating material laterally of the tape base is kept to a minimum—no more than necessary. In other words, the thickness of the coating on the other side portion of the tape base may then be kept substantially at its predetermined optimum value and its magnetic sound-recording and sound-reproducing characteristics remain unimpaired. If the bottom support were to dip as a whole, the coating on the entire transverse section of the tape base would be affected, thus requiring its elimination and splicing of the ends to assure good sound-recording and reproducing tape.

Figures 6, 7, 8, 9, 10:
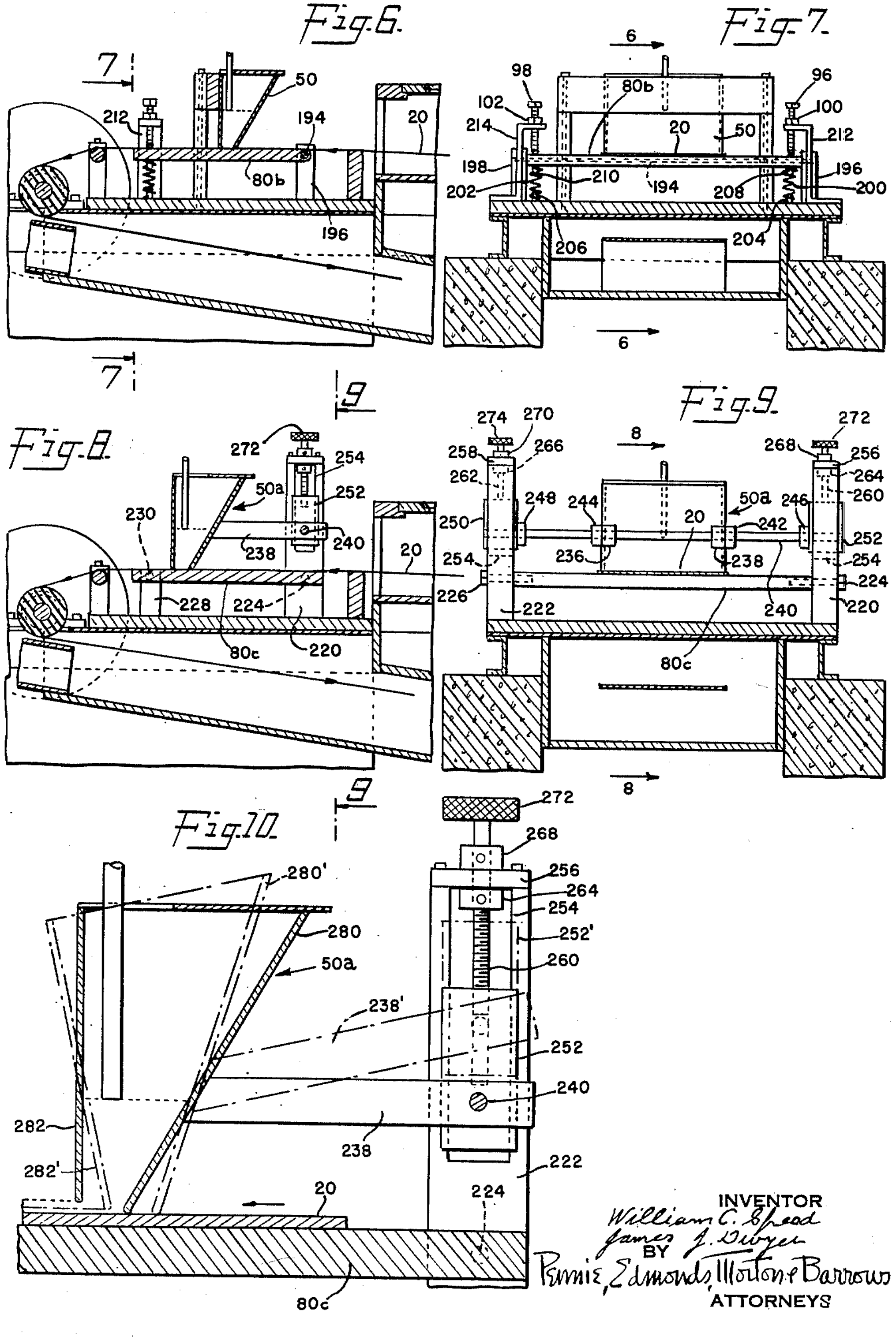
Fig. 6 is a sectional elevation on the line 6—6 of Fig. 7.
Fig. 7 is a section on the line 7—7 of Fig. 6 of a third form of such an apparatus.
Fig. 8 is a sectional elevation on the line 8—8 of Fig. 9.
Fig. 9 is a section on the line 9—9 of Fig. 8.
Fig. 10 is an enlarged view of a portion of a fourth form of such an apparatus.

The third form of apparatus shown in Figs. 6 and 7 differs from the first two forms in the manner in which the gap of minimum depth or height between the feed hopper and the bottom support is provided and maintained. In the first two forms the adjusting screws are supported by the feed hoppers, while in the third (and fourth) form they are supported independently of the feed hopper. The bottom supports are also differently mounted. Thus, in Figs. 6 and 7, bottom support 80*b* is hingedly mounted at its rear end on a transverse rod 194, the ends of which fit in a pair of spaced vertical journals 196 and 198 attached at their lower ends to the platform. The forward end of the bottom support rests on a pair of spaced coil springs 200 and 202 fitting at their lower ends around vertical stub rods 204 and 206 secured to the platform and fitting at their upper ends around stub rods 208 and 210 depending from the bottom support. The bottom support is suspended on the springs between a pair of Z brackets 212 and 214, attached at their lower ends to the platform. Adjustable machine screws 96 and 98 fit in the threaded insulated holes in the tops of the brackets. As before, the screws and lock nuts 100 and 102 operate as stops against the upward movement of the bottom support in order to provide and maintain a gap of minimum depth or height.

In each of the three forms of apparatus described, after the gap of minimum depth is obtained, the position of the feed hopper is fixed and that of the bottom support is adjustable with respect to the feed hopper to permit the passage of an obstruction. The reverse is true in the fourth form of apparatus, illustrated by Figs. 8–10. That is to say, the position of the bottom support is fixed and that of the feed hopper is adjustable with respect to the bottom support to permit the passage of an obstruction on the tape base.

It will be noted in Figs. 8 and 9 that the rear end of bottom support 80*c* is secured to a pair of spaced relatively high vertical posts 220 and 222, attached at their lower ends to the platform, by means of a pair of machine screws 224 and 226, and that the forward end of the bottom support is secured to a pair of spaced relatively low vertical posts 228, also attached at their lower ends to the platform, by means of a pair of machine screws 230. The bottom support is substantially parallel to the platform, both of which are horizontally disposed. The bottom support is thus fixed in its position, not even being adjustable to the extent of permitting its placement with respect to feed hopper 50*a* so as to provide a gap of minimum depth or height; although a construction that would permit such an arrangement is feasible; the latter, however, not being necessary because all necessary adjustments may be made in the present construction with the feed hopper itself. The position of the feed hopper with respect to the bottom support may be adjusted to provide and maintain a gap of minimum depth, and the feed hopper is adjustable at the same time with respect to the fixed bottom support so that the depth of the gap may be increased to permit the passage of an obstruction on the tape base.

Still referring to Figs. 8 and 9, and also to Fig. 10, it will be noted that feed hopper 50*a* is rigidly suspended from the forward ends of a pair of spaced lateral arms 236 and 238. A cross-rod 240 extends through the ends of the arms and collars 242 and 244 adjacent the ends, the collars being secured to the rod by set screws to hold the feed hopper in a fixed lateral position. The ends of the cross-rod extend through similar collars 246 and 248 and fit in slidable box journals 250 and 252 in vertical slots 254 in high vertical posts 220 and 222. The slots are surmounted by tops 256 and 258 bolted to the vertical posts. Threaded rods 260 and 262 fit at their lower ends in threaded holes in the tops of the box journals. The upper ends of the threaded rods extend through under-collars 264 and 266 and over-collars 268 and 270, disposed below and above the tops, the collars being integrally secured to the rods by set screws. The upper ends of the threaded rods terminate in knurled hand wheels 272 and 274. This construction permits the box journals to be raised or lowered by turning the hand wheels.

As already indicated, this fourth form of apparatus permits a gap of minimum depth or height to be established between the feed hopper and the bottom support. This is shown most clearly in Fig. 10. Referring first to the solid line outline of feed hopper 50*a*, it will be noted that the lower end of its rear wall 280 rests on tape base 20 passing thereunder, across the top of bottom support 80*c*, and that the lower end of its forward wall 282 is located above the tape base, the space between the two defining the gap of minimum height or depth. That gap is provided and maintained by a suitable turning of hand wheels 272 and 274, which lower or raise box journals 250 and 252 and hence lateral arms 236 and 238 secured to the feed hopper.

Since the rearward ends of the lateral arms pivot freely on cross-rod 240, rear wall 280 of the feed hopper always rests by gravity on the tape base, whether the box journals are lowered or raised. This is illustrated by the broken line outline of the feed hopper and the co-operating parts of the apparatus. Lateral arm 238 and journal box 252 are shown in a raised position, as 238′ and 252′, this being accomplished by turning the hand wheels. While rear wall 280 is thereby tilted forwardly into a more upright position 280′, it continues to rest on the tape base. Forward wall 282, however, is tilted forwardly to 282′ to lessen the height or depth of the gap between its bottom and the top of the tape base.

In both cases, as shown in the solid line and broken line outlines, the minimum depth or height of the gap is always fixed by the hand wheels and cannot be further decreased except by resorting again to the hand wheels. So long as the position of the hand wheels is not altered, the minimum gap remains fixed.

The present construction, however, permits a temporary increase in depth or height of the gap when an obstruction on the tape base reaches rear wall 280 of the feed hopper. Since the feed hopper is suspended on lateral arms 236 and 238, which in turn pivot freely on cross-rod 240, the feed hopper is free to rise to let the obstruction pass thereunder. In other words, when the obstruction, whether on the top or the bottom of the tape base, or both, reaches the rear wall, the rear wall itself, and hence the feed hopper as a whole, is raised, and the obstruction continues to advance in the normal path of travel of the tape base. As the rear wall rises, the forward wall also rises, thus increasing the depth or height of the gap. As soon as the obstruction passes under the rear wall, the feed hopper pivots back to its former position.

It will be clear to those skilled in this art that the forms of apparatus described above are only by way of illustration, and still other forms may be employed in the practice of the invention.

We claim:

1. In apparatus for producing magnetic sound-recording and sound-reproducing tape by passing a relatively long and narrow tape base to and through a magnetic coating machine for a coating of free-flowing magnetic material, the improvement comprising a coating machine having a feed-hopper with a horizontally disposed bottom discharge opening, a horizontally disposed tape base bottom support thereunder, tensioning means for keeping the tape base taut longitudinally as it passes over the bottom support under the feed-hopper, guide means forwardly and rearwardly of the discharge opening of the feed-hopper positioned immediately adjacent to the normal path of travel of the tape base to keep the under side of the advancing tape base normally in taut surface-to-surface sliding contact with the bottom support while keeping the upper side of the tape base normally out of contact with the feed-hopper, adjustable means for fixing and maintaining the feed-hopper and the tap base support normally at a predetermined minimum distance from one another to provide a gap for the passage therethrough of the tape base and for depositing a layer of a liquid dispersion of the free-flowing magnetic material of uniform minimum thickness onto the top surface of the tape base as it moves under tension over the support, yielding means permitting momentary increase of the height of the gap between them in response to and directly by an obstruction on the tape base just far and long enough to permit the obstruction to pass between the hopper and support without serious damage to the tape base and for decreasing the height of the gap to its former predetermined minimum height as soon as the obstruction passes therethrough, and a pivot support substantially in advance of the hopper and tape base bottom support to facilitate said momentary increase of the height of the gap for the passage of the obstruction therethrough.

2. Apparatus according to claim 1, in which the position of the hopper is fixed, and the means for increasing the size of the gap momentarily are connected with the tape base support so that it may move with respect to the fixed hopper.

3. Apparatus according to claim 1, in which the position of the tape base support is fixed, and the means for increasing the size of the gap momentarily are connected with the feed hopper so that it may move with respect to the fixed tape base support.

4. Apparatus according to claim 1, in which the tape base support is mounted pivotally at its rearward end and resiliently at its forward end.

5. Apparatus according to claim 1, in which the tape base support is mounted on a pivot rearward of the discharge opening and pivotally on a spring forward of the discharge opening, both mountings being located centrally of the normal path of travel of the tape base so that the tape base support may tilt laterally to either side as well as forwardly of the feed hopper to permit passage of the obstruction.

6. Apparatus according to claim 1, in which the tape base support is mounted pivotally rearward of the discharge opening and centrally of the normal path of travel of the tape base, and the tape base support is mounted resiliently forward of the discharge opening and to each side of the normal path of travel of the tape base.

7. Apparatus according to claim 1, in which the feed hopper is fixed, and the adjustable means connect the tape base support for moving the tape base support relative to the feed hopper to fix them with respect to each other to provide the gap for depositing the layer of magnetic material of uniform minimum thickness.

8. Apparatus according to claim 1, in which the position of the tape base support is fixed; and the means for increasing momentarily the size of the gap connect the feed hopper so that it may move with respect to the fixed tape base support, said means including a pivotal arm integrally secured at one end to the feed hopper and pivotally secured at the other end to an anchor spaced from the hopper so that the hopper may pivot away from the fixed tape base support to increase the size of the gap and permit passage of the obstruction.

9. Apparatus according to claim 8, in which adjustable means connect the anchor so that it may be moved to various positions to alter the angle of pivot of the arm and hence the discharge opening of the hopper with respect to the fixed tape base support.

References Cited in the file of this patent

UNITED STATES PATENTS

| | | |
|---|---|---|
| 1,422,545 | Dayton | July 11, 1922 |
| 1,871,790 | Hansen | Aug. 16, 1932 |
| 1,961,025 | Wickham | May 29, 1934 |
| 2,149,307 | Nash | Mar. 7, 1939 |
| 2,190,766 | Bennett | Feb. 20, 1940 |
| 2,249,200 | Edwards | July 15, 1941 |
| 2,332,946 | St. Hilaire | Oct. 26, 1943 |
| 2,421,073 | Kratz | May 27, 1947 |
| 2,494,378 | Dexter | Jan. 10, 1950 |